3,578,619
ited May 11, 1971

3,578,619
PROCESS OF PREPARING METAL CHELATES
OF β-KETOESTERS
James A. Reeder, Poland, Ohio, assignor to
British Columbia Research Council
No Drawing. Filed Feb. 28, 1969, Ser. No. 803,471
Int. Cl. C07c 11/26; C07d 107/00, 3/64
U.S. Cl. 260—22          23 Claims

ABSTRACT OF THE DISCLOSURE

An improved process for preparing metal chelates of β-ketoesters derived from higher alcohols, glycols, polyols or polymers containing hydroxyl groups which comprises reacting a higher alcohol, glycol, polyol or polymer containing hydroxyl groups with a metal chelate of a β-ketoester derived from a volatile alcohol, so that a transesterification takes place with elimination of the volatile alcohol.

BACKGROUND OF THE INVENTION

Field of the invention

Metal chelates of β-ketoesters find commercial use in a variety of applications including fungicides, insecticides, protective coatings, modifiers for plastics and casting resins, crosslinking agents for plastics films, bodying agents for paint and varnish formulations and absorbers for ultraviolet light. The present invention is concerned with an improved process for the preparation of these metal chelates, in particular those formed with metals and β-ketoesters derived from higher alcohols, glycols, polyols and polymers containing hydroxyl groups.

DESCRIPTION OF PRIOR ART

It is known that metal chelates of β-ketoesters may be prepared by reaction of a metal compound with a β-ketoester. Hence, in order to prepare a β-ketoester derived from a higher alcohol it has been necessary to employ a two step process comprising:

(1) the preparation of the uncomplexed β-ketoester of the higher alcohol; followed by
(2) the reaction of the uncomplexed β-ketoester of the higher alcohol with a metal such as the acetate.

In some cases step (2) has been carried out in an aqueous solvent, but this is inconvenient when using the higher β-ketoesters because of their low solubility in water. The polymeric chelates of β-ketoesters derived from glycols, polyols and polymers containing hydroxyl groups have also been prepared in a similar manner. Further the usefulness of this method has been limited by the relative insolubility of metal salts in solvents suitable for the preparation of chelate polymers.

In an attempt to overcome the difficulties set out above, various workers have preferred to use a metal chelate of a volatile chelating agent, such as 2,4-pentanedione in place of the metal acetate. In such cases the preparation of the chelate polymer has been carried out in the absence or presence of a high boiling solvent, and the reaction effected by removing the volatile chelating agent as vapor. This method suffers from several disadvantages. Firstly, even volatile chelating agents have comparatively high boiling points, e.g. 139° C. in the case of 2,4-pentanedione, so that the reaction must be carried out at high temperatures, or over long periods of time. Secondly, the volatile chelating agents are expensive and their vaporization represents an economic loss unless special arrangements are made to recover the vapor.

SUMMARY OF INVENTION

The present invention provides a method for obtaining good yields of the metal chelates of β-ketoesters derived from higher alcohols, glycols, polyols and polymers containing hydroxyl groups by the transesterification of a metal chelate of a β-ketoester derived from a volatile alcohol by reaction with a higher alcohol, a glycol, a polyol or a polymer containing hydroxyl groups. This reaction takes place readily by mixing the appropriate metal chelate of a β-ketoester, derived from a volatile alcohol, with the appropriate higher alcohol, glycol, polyol or hydroxyl polymer and heating the resulting mixture to a temperature of from 50° to 200° C. under either atmospheric or reduced pressure. The more volatile alcohol from the metal chelate used as starting material is removed by volatization thus driving the desired reaction towards completion.

The metal chelates which are employed as starting materials in the process of the present invention have the formula:

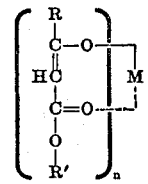

wherein R is a hydrocarbon radical selected from normal, cyclic or branched-chain alkyl or alkenyl radicals of 1 to 18 carbon atoms, aryl radicals and alkyl-substituted aryl radicals of 6 to 24 carbon atoms, and aralkyl radicals of 7 to 24 carbon atoms; R' is an alkyl radical of 1 to 6 carbon atoms, preferably 1 to 2 carbon atoms; M is a metal selected from the group consisting of divalent beryllium, nickel, and copper, and trivalent aluminum; n is equal to 2 in the case of divalent metals and 3 in the case of trivalent metals; and the dotted line denotes a coordinate covalent bond.

The higher alcohols which are employed as starting materials in the present process are primary aliphatic, or alkenyl-substituted aliphatic alcohols of 3 to 24 carbon atoms, secondary-aliphatic, or alkenyl-substituted aliphatic alcohols of 6 to 24 carbon atoms, primary or secondary aryl-substituted aliphatic alcohols of 7 to 24 carbon atoms, and ethers or esters containing one free hydroxyl radical and 3 to 36 carbon atoms. The polyols which are employed as starting materials in the present process are those in which the hydroxyl groups are primary or secondary and which are derived from alkyl, cycloalkyl, alkenyl or aralkyl radicals of 2 to 18 carbon atoms, and ethers or esters containing at least two hydroxyl radicals and 4 to 36 carbon atoms. The polymeric compositions which are employed as starting materials in the present process are polymers which contain attached hydroxyl radicals, and which may also contain ether, ester or halogen radicals.

DESCRIPTION OF PREFERRED EMBODIMENTS

The process of the present invention is preferably affected at from 80° to 170° C.

The metal chelate and alcohol used as the starting materials can be mixed in stoichiometric proportions and the reaction conducted in a solvent, such as benzene or toluene, with which the more volatile alcohol forms an azeotropic mixture. On the other hand, it is more convenient in some cases to carry out the reaction in the higher alcohol as a solvent, particularly when this alcohol is also volatile, or when the product is insoluble in the alcohol. In other cases in which a fusible polymer is formed as the product, it is preferred to carry out the reaction in the molten state in the absence of solvent. In such cases the reaction may be facilitated by providing a capillary to bubble nitrogen or other inert gas through the melt, since the removal of the volatile alcohol vapor is facilitated thereby. In cases where the ultimate product of the reaction is a crosslinked resin, it is preferred to carry out the last stages of the reaction with the reaction mixture in the form of a thin film or coating. The reaction proceeds more rapidly with primary alcohols than with secondary alcohols.

Examples of metal chelates which are used as preferred starting materials in the present process are the beryllium, nickel, copper, and aluminum chelates of methyl acetoacetate, ethyl acetoacetate, n-propyl acetoacetate, isopropoyl acetoacetate, t-butyl acetoacetate, n-amyl acetoacetate, isoamyl acetoacetate, n-hexylacetoacetate, methyl benzoylacetate, ethyl benzoylacetate, isopropyl benzoylacetate, methyl pivaloylacetate, ethyl pivaloylacetate, methyl butyrylacetate, ethyl 2 - ethylhexanoylacetate, methyl lauroylacetate, methyl stearoylacetate, ethyl p-toluylacetate, ethyl p-t-butylbenzoylacetate, methyl p-phenylbenzoylacetate, ethyl naphthoylacetate, and isopropyl β-phenylpropionylacetate.

Preferred alcohols which are used as starting materials in the present process are n-propyl alcohol, n-butyl alcohol, n-amyl alcohol, isoamyl alcohol, 2-ethylhexyl alcohol, dodecyl alcohol, octadecyl alcohol, ethylene glycol monomethyl ether, ethylene glycol monoethyl ether, ethylene glycol monoacetate, ethylene glycol monostearate, diethylene glycol monomethyl ether, diethylene glycol monobutyl ether, diethylene glycol mono(1,1,3,3-tetramethylbutyl) ether, tetramethylene glycol monoacetate, hexamethylene glycol monoethyl ether, octamethylene glycol mono(p-t-butylphenyl) ether, benzyl alcohol, hydrocinnamyl alcohol, allyl alcohol, cyclohexanol, ethyl isoamyl carbinol, and 1-phenyl-3-butanol.

Preferred polyols which are used as starting materials in the present process are ethylene glycol, 1,3-propanediol, 1,4-butanediol, 1,6-hexanediol, 1,8-octanediol, 1,10-decanediol, 2,2-dimethylpropane-1,3-diol, diethylene glycol, o-xylylenediol, m-xylylenediol, p-xylylenediol, 1,4-bis(hydroxymethyl) cyclohexane, 1,3-cyclohexanediol, glycerol, pentaerythritol, sucrose, glycerol monostearate, o-dodecylsucrose, sucrose monopalmitate, sucrose triacetate, and linseed oil monoglyceride.

Examples of polymeric compositions which are used as preferred starting materials in the present process are polyesters containing hydroxyl end groups, e.g., poly(oxydiethylene)maleate and poly(ethylene)adipate; polyethers containing hydroxyl end groups, e.g., triethylene glycol, poly(ethylene glycol), poly(propylene glycol), poly(tetramethylene glycol), and poly(hexamethylene glycol); alkyd resins containing hydroxyl groups, e.g., polyglyceryl phthalate; drying oil-modified alkyd resins containing hydroxyl groups, e.g., a resin derived from phthalic anhydride and linseed oil monoglyceride; vinyl polymers containing pendant hydroxyl groups, e.g., fully or partially hydrolyzed polymers of vinyl acetate or copolymers of vinyl acetate with ethylene, vinyl chloride, or ethyl acrylate; acrylic polymers containing pendant hydroxyl groups, e.g., polymers or copolymers of hydroxyethyl acrylate or hydroxyethyl methacrylate and cellulose derivatives, e.g., methylcellulose, ethylcellulose, and hydroxyethylcellulose.

The present invention will be further illustrated by way of the following examples:

EXAMPLE 1

The copper chelate of n-propyl acetoacetate was prepared in the following manner: A solution of 13.0 g. (0.0404 mole) of bis(ethylacetoacetato)copper(II) in 35 ml. of dry n-propyl alcohol was subjected to slow distillation through a fractionating column. Propyl alcohol was added continuously to replace the alcohol removed by distillation. Nine fractions of 5 ml. each were collected over a period of three hours and analyzed by vapor phase chromatography. These fractions contained decreasing amounts of ethyl alcohol, and the last fraction was pure n-propyl alcohol. Evaporation of the solvent and recrystallization from ether gave 13.2 g. (94%) of the pure product, M.P. 131–132.5° C.

*Analysis.*—Calcd. for $C_{14}H_{22}CuO_6$ (percent): C, 48.06; H, 6.34. Found (percent): C, 47.80; H, 6.27.

Bis(methylacetoacetato)copper(II) was converted to bis(ethylacetoacetato)copper(II) in 98% yield by a similar process.

EXAMPLE 2

The copper chelate of amyl acetoacetate was prepared in the following manner: A solution of 16.0 g. (0.05 mole) of bis(ethylacetoacetato)copper(II) in 20 ml. of dry amyl alcohol was heated 20 hours on a steam bath. During this time 1.05 g. (45% yield) of ethyl alcohol was collected as the distillate. The solution was cooled to precipitate a mixture of copper chelates. This mixture was filtered, dried and extracted with 300 ml. of hexane. The insoluble starting material was removed by filtration. The filtrate was evaporated to dryness and fractionally crystallized from hexane to yield 6.8 g. of product, M.P. 99 to 103° C.

EXAMPLE 3

The aluminum chelate of n-propyl acetoacetate was prepared as follows: A solution of 41.4 g. (0.1 mole) of tris(ethylacetoacetato)aluminum(III) in 36 g. of n-propyl alcohol was subjected to slow distillation in the manner of Example 1. Nineteen fractions of 5 ml. each were collected in 16 hours. These fractions contained decreasing amounts of ethyl alcohol, of which a trace remained in the last fraction. The product was isolated by vacuum distillation through a fractionating column. After a forerun of 12.2 g. boiling at 152–161° C. (0.35 mm.), the pure product was collected at 161–169° C. (0.5 mm.). It was a colorless, slightly viscous oil of $n_D^{20}$ 1.5030.

*Analysis.*—Calcd. for $C_{21}H_{35}AlO_9$ (percent): C, 55.01; H, 7.26; Al, 5.89. Found (percent): C, 54.57; H, 7.18; Al, 6.04.

EXAMPLE 4

The polymeric copper chelate of 2,2-dimethylpropane 1,3-bis(acetoacetate) was prepared in the following manner: A solution of 28.056 g. (0.09551 mole) of bis (methyl acetoacetato)copper(II) and 9.948 g. (0.09552 mole) of 2,2-dimethylpropane-1,3-diol in 250 ml. of benzene was subjected to very slow distillation. The volume was maintained by adding benzene. After four days the benzene was replaced by toluene and the distillation continued eight days. The product (30.5 g., 91%) was a green powder very slightly soluble in boiling toluene. Elemental analysis for carbon, hydrogen and copper agreed with that calculated for an infinite polymer.

*Analysis.*—Calcd. for $C_{13}H_{18}CuO_6$ (percent): C, 46.77; H, 5.44; Cu, 19.03. Found (percent): C, 46.84; H, 5.45; Cu, 18.84.

The polymer was soluble in pyridine or in a mixture of 20 volume percent pyridine and 80 volume percent benzene to form viscous green solutions. The solutions gave hard, green, transparent coatings when cast onto glass plates.

EXAMPLE 5

The polymeric beryllium chelate of 2,2-dimethylpropane 1,3-bis(acetoacetate) was prepared in the following manner: A solution of 2.392 g. (0.0 1mole) of bis(methylacetoacetato)beryllium(II) and 1.0623 g. (0.0102 mole) of 2,2-dimethylpropane-1,3-diol in 15 ml. of benzene was subjected to slow distillation. The volume was maintained by adding benzene. After 24 hours the benzene was replaced by toluene and the distillation continued 91 hours. The viscous reaction mixture was freed of solvent by the use of a nitrogen capillary under high vacuum at 110° C. After cooling the product was a brittle, colorless glass. The molecular weight was 1400 as measured in benzene solution. Elemental analysis for carbon, hydrogen and beryllium agreed with that calculated for a linear polymer with five repeating units, having one methyl and one diol end group.

*Analysis*.—Calcd. for $C_{66}H_{94}Be_5O_{31}$ (percent): C, 55.51; H, 6.64; Be, 3.23. Found (percent): C, 55.65; H, 6.60; Be, 3.21.

EXAMPLE 6

An aluminum chelate polymer was prepared by the transesterification of tris(ethylacetoacetato) aluminum (III) with diethylene glycol. This reaction gave a soluble polymer which could be crosslinked by further treatment to yield an insoluble resin.

A mixture of 41.8 g. of tris(ethylacetoacetato)aluminum(III) and 16.08 of diethylene glycol was heated 5 hours at 100° C. in a distillation flask. A nitrogen capillary was inserted below the surface of the liquid and heating was continued 8 hours at 100° C. The product was a very viscous clear syrup. Glass plates were coated with films of this material in 70% benzene solution. After baking two hours at 115° C., the coatings were transparent, colorless, hard and brittle. Benzene did not dissolve the coatings but softened them slightly.

EXAMPLE 7

A chain-extended polymer was prepared by ester interchange between bis(methylacetoacetato) copper (II) and a prepolymer with hydroxy end groups.

The prepolymer was a polyester prepared by the method of U.S. Pat. 2,625,535 from 175.7 g. of adipic acid, 53.2 g. of ethylene glycol and 43.5 g. of propylene glycol. It was a white waxy solid with a hydroxyl number of 118.5, a carboxyl number of 6.5, and an average molecular weight of 901. A molten mixture containing 20 g. of this prepolymer and 6.5 g. of bis(methylacetoacetato)copper(II) was heated in a distillation flask at 100° C. The distillate, identified as methyl alcohol, was removed by the passage of nitrogen through a capillary under the surface of the liquid. After 48 hours the melt viscosity had increased to the point where stirring became difficult. The green reaction mixture was then heated for 32 hours at 100° C., under a pressure of 2.5 mm. The product was a soft, tacky material which slowly crystallized at room temperature to yield a hard waxy solid. It was readily soluble in benzene.

EXAMPLE 8

An aluminum chelate polymer was prepared by ester interchange between the prepolymer of Example 7 and tris(ethylacetoacetato)aluminum(III). This reaction gave a soluble, chain extended polymer, which could be crosslinked by further treatment to yield an insoluble resin.

A molten mixture containing 20 g. of prepolymer and 9.2 g. of tris(ethylacetoacetato)aluminum(III) was heated one hour at 100° C. and atmospheric pressure, one hour at 100° C. and 12 mm. pressure, and one hour at 100° C. and 0.5 mm. pressure. The distillate, identified as ethyl alcohol, was removed with nitrogen capillary as in the previous example. The product was a colorless, tacky material which slowly crystallized to a white solid soluble in benzene. Prolonged storage at room temperature caused the polymer to become partially crosslinked, so that it swelled but did not completely dissolve in benzene.

Glass panels were coated with a 50% benzene solution of the fresh polymer, air dried, and baked two hours at 125° C. The coating thus obtained was hard, transparent, colorless and adherent. It was insoluble in benzene but softened slightly when treated with benzene.

EXAMPLE 9

A chain-extended polymer was prepared by ester interchange between bis(methylacetoacetato)copper(II) and an unsaturated prepolymer. The prepolymer was a polyester of maleic acid with hydroxyl end groups. The resulting copper chelate polymer was soluble in organic solvents. Solutions in styrene could be cured to yield a soft, resinous composition.

The prepolymer was prepared as follows: A mixture of 116.7 g. of diethylene glycol and 93.1 g. of maleic anhydride was heated in a distillation flask, using a nitrogen capillary as in the previous example. The temperature was raised from 60° C. to 100° C. during three hours, then held at 100° C. for 30 minutes at atmospheric pressure. The pressure was reduced to 15 mm., and the temperature was raised to 170° C. over a period of two hours. Heating was continued at 170° C. for four hours. The resulting prepolymer had a carboxyl number of 27.

The prepolymer was cooled to room temperature in the original reaction flask, and 14.7 g. of bis(methylacetoacetato)copper(II) were added. The mixture was heated at 100° C. for 30 minutes under atmospheric pressure and for 1 hour under a pressure of 15 mm., using the nitrogen capillary. The distillate was identified as methyl alcohol. The viscous reaction product was dissolved in 75 g. of styrene at 60° C., to yield 262 g. of a green solution. A portion of this solution was mixed with 3% of benzoyl peroxide, poured into a mold, and partially cured by heating one hour at 100° C. The green, transparent resin which resulted was rubbery and slightly tacky.

EXAMPLE 10

An aluminum chelate polymer was prepared by ester interchange between tris(ethylacetoacetato)aluminum(III) and an unsaturated polyester prepolymer. The product was dissolved in styrene to give a thermosetting resin.

The prepolymer was prepared by the method of the previous example from 116.7 g. of diethylene glycol and 88.25 g. of maleic anhydride, and had a carboxyl number of 29. The prepolymer was mixed with 14.4 g. of tris (ethylacetoacetato)aluminum(III). The reaction mixture was heated at 100° for one hour under atmospheric pressure and for three hours under a pressure of 20 mm., using a nitrogen capillary as in the previous example. The distillate was identified as ethyl alcohol. The viscous reaction product was dissolved at 60° C. in 83 g. of styrene containing 0.02 g. of hydroquinone. A portion of this solution was mixed with 2% benzoyl peroxide, poured into molds, and cured 30 minutes at 100° C. The resulting light yellow resin was hard, transparent and resistant to impact. Another portion of the solution was mixed with 0.5% by weight of a 6% solution of cobalt naphthenate, and 0.09% methyl ethyl ketone hydroperoxide. The resulting resin cured in about 24 hours at room temperature. A third portion of the solution was mixed with 0.2% paraffin wax, 0.5% by weight of a 6% solution of cobalt naphthenate, and 0.09% methyl ethyl ketone hydroperoxide. Flexible films were prepared by casting this solution on glass plates and curing 24 hours at room temperature.

EXAMPLE 11

Ethylcellulose was crosslinked by transesterification with tris(ethylacetoacetato)aluminum(III) to yield clear films having greater resistance to heat and solvents than those obtained from uncrosslinked ethylcellulose. The ethylcellulose used in this example was type N–50 manufactured by the Hercules Powder Company. It had a viscosity of 42 cps. as measured at 5% concentration in a solvent consisting of 80% toluene and 20% ethanol, and an ethoxyl content by 48.4% weight.

A solution containing 4.62 g. of ethylcellulose in 50 ml. of benzene was mixed rapidly with another solution containing 1.38 g. of tris(ethylacetoacetato)aluminum (III) in 10 ml. of benzene. A portion of the solution was rapidly cast onto glass plates in the form of wet films.

The remaining solution increased rapidly in viscosity about one minute after mixing, and gelled within five minutes. The glass plates were air dried, and then heated one hour at 115° C. under atmospheric pressure and two hours at 180° C. under 2 mm. pressure. The resulting transparent, light yellow resin was flexible in thin films (1–3 mils) but somewhat brittle in thick films (5–6 mils). It was insoluble in benzene but swelled reversibly to a 25% increase in volume. The resin did not have a definite softening temperature, but underwent a slight elastic deformation when pressed with a spatula at 200° C. The unmodified ethylcellulose had a softening temperature of 150–160° C.

EXAMPLE 12

A prepolymer prepared from linseed oil monoglyceride and phthalic anhydride was chain-extended by transesterification with tris(ethylacetoacetato)aluminum(III). The resulting modified alkyd resin was useful as a clear varnish for wood.

The prepolymer was prepared by a modification of the method disclosed in British Pat. 359,365. A mixture of 118.4 g. of linseed oil and 0.5 g. litharge was heated to 235° C. in a flask equipped with a mechanical stirrer, a nitrogen capillary below the surface of the liquid, and a distillation receiver. Glycerol (25.6 g.) was added slowly over a period of 20 minutes. The mixture was heated at 220° C. for 30 minutes, during which time it became homogeneous. Phthalic anhydride (43.2 g.) was added and the mixture was heated 24 hours at 250° C., using the nitrogen capillary to remove water formed in the reaction.

The resulting prepolymer was cooled to 103° C., and 30.2 g. of tris(ethylacetoacetato)aluminum(III) was added. This mixture was heated for seven hours at 92–106° C., using the nitrogen capillary to remove the distillate, which was identified as ethyl alcohol. The product was a very viscous brown liquid. A portion of this resin was dissolved in benzene to form a 50% solution, and 1.5% by weight of a 6% solution of cobalt naphthenate was added. When the resulting varnish was brush coated onto wood panels, it air dried to a tack-free finish within eight hours and was hard dry within 24 hours. Three coats of the varnish were applied to panels of pine and western red cedar by the method of ASTM specification D38–55. The coatings were clear and transparent, and had a 60° specular gloss of 91 to 92 as determined by the method of ASTM specification D523–62T.

EXAMPLE 13

A modified alkyd resin was prepared by a method similar to that described in the previous example, except that the prepolymer was chain-extended with tris(ethylbenzoylacetato)aluminum(III).

The prepolymer was prepared as in the previous example, and had a carboxyl number of 5.6. The polymer was cooled to 120° C., and 43.8 g. of tris(ethylbenzoylacetato)aluminum(III) was added. The solution was heated at 150° C. for 4.5 hours during which ethyl alcohol was removed as the distillate. The product was viscous, turbid semisolid which became clear when dissolved in benzene. A portion of this resin was dissolved in benzene to form a 50% solution, and 1.5% by weight of a 6% solution of cobalt naphthenate was added. The resulting varnish had air-drying properties similar to those of the previous example. Three coats applied to pine and cedar panels were clear and transparent, and had a 60° gloss of 89 to 92.

EXAMPLE 14

A polymer was prepared by the tranesterification of linseed oil monoglyceride with tris(ethylacetoacetato) aluminum(III). The polymer had air-drying properties and was useful as a clear varnish for wood.

A mixture of 68.6 g. of linseed oil, 0.29 g. of litharge and 14.85 g. of glycerol was heated 30 minutes at 235° C. as in the previous examples. The mixture was cooled to 120° C. and 75.4 g. of tris(ethylacetoacetato)aluminum (III) was added. The solution was heated 10 hours at 103–114° C. A nitrogen capillary was used to remove the distillate, identified as ethyl alcohol. The resulting polymer was a viscous syrup. A 50% benzene solution containing cobalt drier was prepared as in the previous examples. The drying time of this varnish was similar to that in the previous examples, and three coats were applied to pine and cedar panels. The coatings were clear and transparent, and had a 60° gloss of 88 to 92.

EXAMPLE 15

A polymer was prepared by the transesterification of linseed oil monoglyceride with tris(ethylbenzoylacetato) aluminum(III). The polymer had air-drying properties and was useful as a clear varnish for wood.

A mixture of 19.5 of linseed oil, 0.082 g. of litharge and 4.25 of glycerol was heated 30 minutes at 235° C. as in the previous examples. The solution was cooled to 120° C., and 35.9 g. of tris(ethylbenzoylacetato)aluminum(III) was added. The mixture was heated five hours at 145–149° C. A nitrogen capillary was used to remove the distillate, identified as ethyl alcohol. The resulting polymer was a tacky resinous semisolid. A 50% benzene solution containing cobalt drier was prepared as in the previous examples. The drying time was similar to that in the previous examples, and three coats were applied to pine and cedar panels. The coatings were clear and transparent, with a 60° gloss of 90 to 96.

What I claim as my invention is:

1. A process which comprises transesterifying a metal chelate of the general formula

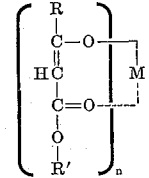

wherein R is a hydrocarbon radical selected from the group consisting of normal, cyclic or branched-chain alkyl or alkenyl radicals of from 1 to 18 carbon atoms, aryl radicals and alkyl-substituted aryl radicals of from 6 to 24 carbon atoms, and aralkyl radicals of from 7 to 24 carbon atoms; R' is a primary, secondary or tertiary alkyl radical of from 1 to 6 carbon atoms; M is a metal selected from the group consisting of divalent beryllium, nickel, and copper, and trivalent aluminum; and $n$ is equal to 2 in the case of divalent metals and 3 in the case of trivalent metals, by reacting it at 50° to 200° C. with an alcohol containing one or more hydroxyl groups attached to primary or secondary aliphatic carbon atoms, and removing an alcohol of formula R'—OH during the course of the reaction.

2. A process as claimed in claim 1 in which the reaction is effected at 80 to 170° C.

3. The process of claim 1, wherein the alcohol is an aliphatic, cycloaliphatic, alkenyl-substituted aliphatic, or aryl-substituted aliphatic alcohol of 3 to 24 carbon atoms.

4. The process of claim 1, wherein the alcohol is an aliphatic, cycloaliphatic, alkenyl-substituted aliphatic, or aryl-substituted aliphatic glycol of 2 to 24 carbon atoms, and wherein the hydroxyl radical or hydroxyl radicals are attached to primary or secondray aliphatic carbon atoms.

5. The process of claim 4, wherein the glycol is ethylene glycol, propylene glycol, 1,3-propanediol, 2,2-dimethylpropane-1,3-diol, 1,4-butanediol, or 1,6-hexanediol.

6. The process of claim 1, wherein the alcohol is an aliphatic, cycloaliphatic, alkenyl-substituted aliphatic, or aryl-substituted aliphatic polyol of 3 to 24 carbon atoms, having 3 to 8 hydroxyl radicals attached to primary or secondary aliphatic carbon atoms.

7. The process of claim 1, wherein the alcohol is substituted, on carbon atoms which are not attached to hydroxyl radicals, with 1 to 7 organic radicals selected from the group consisting of hydroxyalkyleneoxy radicals, alkoxy radicals, cycloalkoxy radicals, alkenyloxy radicals, aralkyloxy radicals, aryloxy radicals, hydroxyalkenylcarboxy radicals, alkylcarboxy radicals, cycloalkylcarboxy radicals, alkenylcarboxy radicals, aralkylcarboxy radicals, arylcarboxy radicals, carboxyalkylenehydroxy radicals, carboxyalkyl radicals, carboxycycloalkyl radicals, carboxyalkenyl radicals, carboxyaralkyl radicals, and carboxyaryl radicals, and wherein the total number of carbon atoms within the substituted alcohol does not exceed 36.

8. The process of claim 7, wherein the organic alcohol is diethylene glycol, diethylene glycol monoethyl ether, diethylene glycol monoacetate, or linseed oil monoglyceride.

9. The process of claim 7 wherein the alcohol is a polymer containing one or more hydroxyl radicals attached to primary or secondary aliphatic carbon atoms.

10. The process of claim 1, wherein the alcohol is a polymer containing one or more hydroxyl radicals attached to primary or secondary aliphatic carbon atoms.

11. The process of claim 10, wherein the polymer is a polyester or copolyester derived from dicarboxylic acids and glycols which may be aliphatic, cycloaliphatic, olefinic, or aromatic, and which contains three or more repeating units in the polymer chain.

12. The process of claim 11 in which the polyester contains repeating units derived from maleic acid, and is thus capable of copolymerizing with styrene.

13. The process of claim 11 in which the polymeric alcohol is an alkyd resin or a drying oil-modified alkyd resin.

14. The process of claim 10, wherein polymer chain is composed of aliphatic carbon-carbon single bonds, and the polymer has an average molecular weight greater than 900.

15. The process of claim 14 in which the polymeric alcohol is partially hydrolyzed polyvinyl acetate or a partially hydrolyzed copolymer of vinyl acetate.

16. The process of claim 14 wherein the polymer is substituted, on carbon atoms not attached to hydroxyl radicals, or to organic radicals with one or more inorganic radicals selected from the group consisting of fluoride, chloride and bromide.

17. The process of claim 10 wherein the polymer is either a poly-(alkylene ether) in which the alkylene group is either straight chain alkylene or cycloalkylene and is unsubstituted or substituted by an aryl group, or a poly-(arylene ether) with three or more repeating units in the polymer chain.

18. The process of claim 17 in which the polymeric alcohol is a derivative of cellulose.

19. The process of claim 17 in which the polymeric alcohol is triethylene glycol, poly(ethylene glycol), poly(propylene glycol), or poly(tetramethylene glycol).

20. The process of claim 1, wherein the metal chelate is the beryllium(II), copper(II), or nickel(II) chelate of methyl acetoacetate or ethyl acetoacetate.

21. The process of claim 1, in which the metal chelate is the aluminum(III) chelate of methyl acetoacetate or ethyl acetoacetate.

22. The process of claim 1, in which the metal chelate is the beryllium(II), copper(II), or nickel(II), chelate of methyl benzoylacetate or ethyl benzoylacetate.

23. The process of claim 1, wherein the metal chelate is the aluminum(III) chelate of methyl benzoylacetate or ethyl benzoylacetate.

References Cited

UNITED STATES PATENTS

| | | | |
|---|---|---|---|
| 3,157,682 | 11/1964 | Ramsden | 260—429 |
| 3,272,853 | 9/1966 | Braun | 260—438.1 |

FOREIGN PATENTS

| | | | |
|---|---|---|---|
| 572,133 | 3/1959 | Canada | 260—429 |
| 1,071,693 | 12/1959 | Germany | 260—429 |

DONALD E. CZAJA, Primary Examiner

R. W. GRIFFIN, Assistant Examiner

U.S. Cl. X.R.

106—15; 117—124, 148, 161, 165; 260—2, 75, 212, 231, 410, 429, 438.1, 439, 448